Oct. 27, 1931.  A. KÉGRESSE  1,828,933
SHOCK ABSORBING ROLL FOR MOTOR VEHICLES
Filed Oct. 21, 1929

Inventor;
ADOLPHE KÉGRESSE,
By Emil Bonnelycke Atty.

Patented Oct. 27, 1931

1,828,933

UNITED STATES PATENT OFFICE

ADOLPHE KÉGRESSE, OF COURBEVOIE, FRANCE

SHOCK ABSORBING ROLL FOR MOTOR VEHICLES

Application filed October 21, 1929, Serial No. 401,341, and in France October 27, 1928.

A vehicle intended for running on all grounds often encounters obstacles which must be run over, such as small watering channels, slopes and the like.

With such a vehicle where the steering is effected by the front wheels, the impacts due to ground unevenness are taken care of by the latter.

In cross-country running, such obstacles are also often met as big stones, trunks of trees and like obstructions of all kinds which may cause serious damage to the vehicle and particularly to the front axle or the bottom of the crank case of the engine.

This invention resides in a device designed to facilitate the passage of the vehicle over obstacles encountered, absorb the shocks and thus protect the running gear of the vehicle, principally the front axle and the crank case of the engine.

Figure 1:
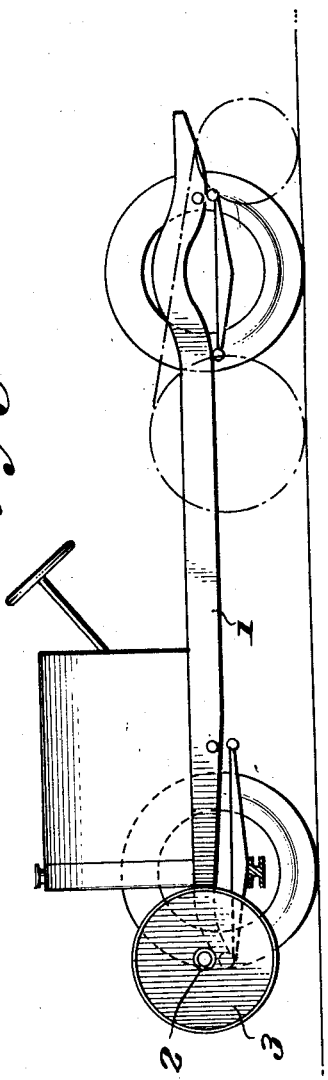
Figure 1 is an elevational view of the proposed device.
Figure 2:
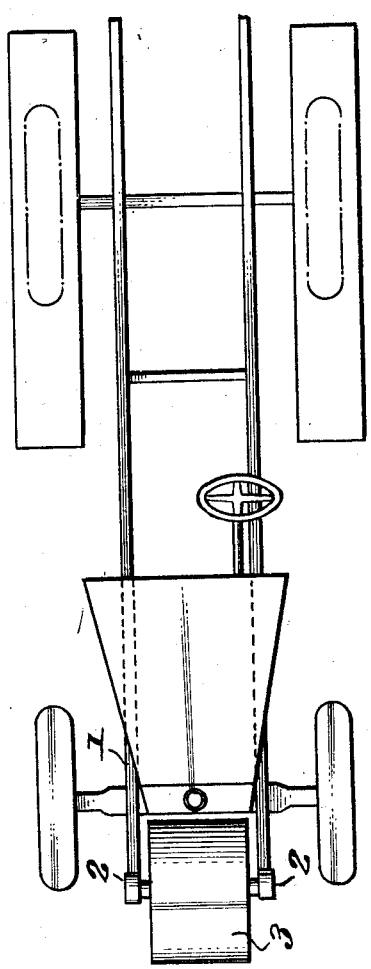
Figure 2 is a plan view of the same.

It will be appreciated that the figures represent the front portion of an ordinary motor car which may be driven by wheels or by an endless tractor belt arranged at the back end of the vehicle.

Rigidly secured between the front ends of the frame 1 is a shaft 2 which may be utilized as a bracing member for the frame; loosely mounted upon said shaft 2 is a large-diameter roll 3.

The roll is so arranged that its center of gravity will be located above the axis of the front wheels and in decided overhanging relation thereto.

The roll is so dimensioned in diameter that its bottom portion will be lower than that of the front axle and its front portion will decidedly project beyond the circumference of the wheels.

The arrangement being such, it will be appreciated that when an obstacle is encountered, for example a slope, the obstacle will first be engaged by the front portion of the roll, thus relieving the steering wheels.

Moreover, for instance, if a big stone stands in the way, the lower portion of the roll will engage the stone before the front axle, preserving the same from any direct impact whereby it might be injured.

I claim as my invention:

1. In a shock-absorbing device for use on cross-country motor vehicles, a chassis embodying side bars extending beyond the ends of the body of the chassis, vehicle wheels, a cross-piece connected at its ends to the side bars and forming a brace for the same, and a shock-absorbing wheel located above and in front of the centers of the vehicle wheels.

2. A shock-absorbing device according to claim 1, in which the shock-absorbing wheel is arranged between the ends of the side bars and is mounted on the cross-piece, the latter constituting a stationary shaft for the said wheel.

In testimony whereof, I affix my signature.

ADOLPHE KÉGRESSE.